US011266071B1

(12) United States Patent
Krahling

(10) Patent No.: US 11,266,071 B1
(45) Date of Patent: Mar. 8, 2022

(54) WINDROW MERGER WITH ACTIVE WEIGHT TRANSFER SYSTEM

(71) Applicant: H & S Manufacturing Co., Inc., Marshfield, WI (US)

(72) Inventor: Michael J. Krahling, Hortonville, WI (US)

(73) Assignee: H & S Manufacturing Co., Inc., Marshfield, WI (US)

( * ) Notice: Subject to any disclaimer, the term of this patent is extended or adjusted under 35 U.S.C. 154(b) by 0 days.

(21) Appl. No.: 17/004,760

(22) Filed: Aug. 27, 2020

(51) Int. Cl.
| F15B 11/16 | (2006.01) |
| A01D 78/00 | (2006.01) |
| A01D 78/14 | (2006.01) |
| F15B 1/02 | (2006.01) |
| F15B 1/033 | (2006.01) |

(52) U.S. Cl.
CPC ............ *A01D 78/002* (2013.01); *A01D 78/14* (2013.01); *F15B 1/024* (2013.01); *F15B 1/033* (2013.01); *F15B 11/16* (2013.01); *A01D 78/144* (2013.01); *F15B 2201/51* (2013.01); *F15B 2211/212* (2013.01); *F15B 2211/526* (2013.01); *F15B 2211/6309* (2013.01); *F15B 2211/6313* (2013.01); *F15B 2211/6653* (2013.01); *F15B 2211/71* (2013.01)

(58) Field of Classification Search
CPC .......... F15B 1/024; F15B 1/033; F15B 11/16; F15B 2211/526; F15B 2211/6313; F15B 2211/212; F15B 2211/71; F15B 2201/51; F15B 2211/6309; F15B 2211/6653; A01F 78/002; A01F 78/14; A01D 78/002; A01D 78/14
See application file for complete search history.

(56) References Cited

U.S. PATENT DOCUMENTS

| 2,195,381 | A | 3/1940 | Patterson |
| 5,005,342 | A | 4/1991 | Lundahl et al. |
| 5,107,663 | A | 4/1992 | Wattron et al. |
| 6,212,865 | B1 | 4/2001 | Peeters et al. |
| 6,694,715 | B2 | 2/2004 | Schoenherr |
| 6,715,274 | B2 | 4/2004 | Peeters et al. |
| 8,863,489 | B2 | 10/2014 | Landon et al. |
| 9,038,358 | B2 | 5/2015 | Landon et al. |
| 9,295,189 | B2 | 3/2016 | Landon et al. |

(Continued)

OTHER PUBLICATIONS

Statement Under 37 CFR 1.56, 1 page.

*Primary Examiner* — Michael Leslie
*Assistant Examiner* — Daniel S Collins
(74) *Attorney, Agent, or Firm* — Stephen C. Jensen; Northwind IP Law

(57) ABSTRACT

Windrow mergers employ one or more design features as described herein in connection with a suspension assembly that allows the pickup head to rise or fall relative to a frame of the merger. One feature maintains a substantially constant force or pressure between a pickup head of the merger and the terrain regardless of a height of the head. Another feature maintains a substantially constant hydraulic pressure in a hydraulic actuator that connects the pickup head to a frame assembly of the merger. Still another feature employs a hydraulic pump driven by a power takeoff (PTO) of the tractor to charge and discharge a hydraulic actuator arranged to raise and lower the pickup head of the merger between an upper limit and a lower limit.

14 Claims, 13 Drawing Sheets

(56) References Cited

U.S. PATENT DOCUMENTS 9,723,776 B2 * 8/2017 Sporrer ............... A01B 29/048
2009/0241503 A1 * 10/2009 Babler .................. A01D 84/00
56/366

* cited by examiner

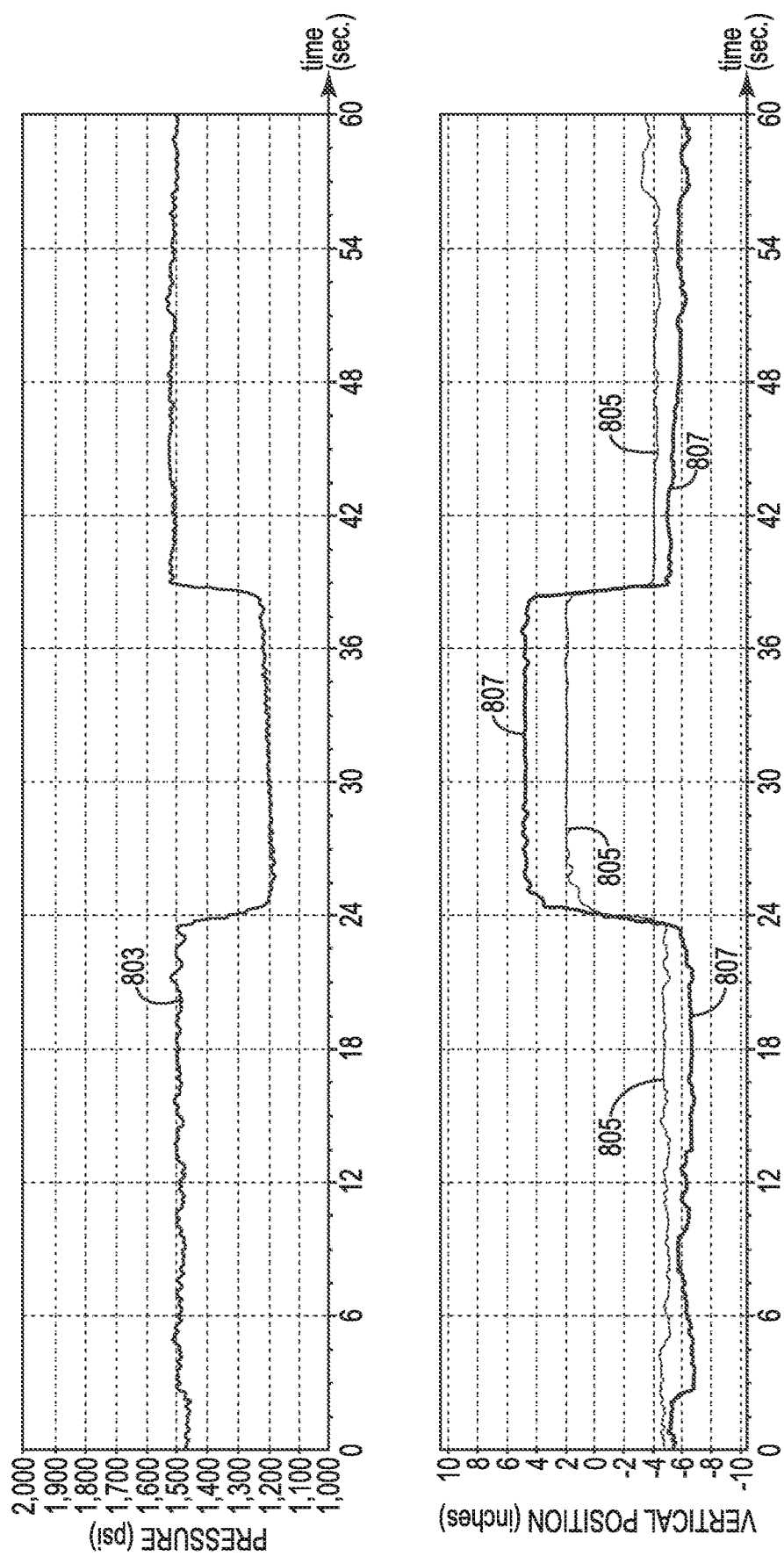

WINDROW MERGER WITH ACTIVE WEIGHT TRANSFER SYSTEM

FIELD OF THE INVENTION

The present invention relates to farm implements commonly known as mergers or windrow mergers. The invention also pertains to related methods, systems, and articles.

BACKGROUND

The process of harvesting hay and certain other crops involves an initial step of cutting and raking the crop into a series of long, parallel rows referred to as windrows. These windrows, which are relatively small or short, may remain on the field for several days to allow the crop to be dried by the sun and wind. Thereafter, the dried crop is picked up from the field for further harvesting operations.

To improve efficiency in the later harvesting steps, it has been known since at least the 1930s to use an implement known as a windrow merger to combine multiple ones of the short, dried windrows into a single, larger windrow, or sometimes into two larger windrows. Depending on the size of the field, this can greatly reduce the number of passes across the field required to complete the harvesting work.

A schematic depiction of a windrow merger in operation is shown in FIG. 1. There, a tractor T pulls a windrow merger M across a field F, where numerous small windrows SW have dried. As the tractor advances, the merger M simultaneously picks up multiple ones of these windrows SW, along with any other loose crops in its path, and combines them into one larger windrow LW on one side of the merger M. In the depicted scenario, four of the windrows SW are gathered together and deposited atop a fifth windrow SW to yield the single larger windrow LW, thus reducing the number of windrows needed to be processed in later steps by a factor of five. In other known embodiments, the merger may deposit the collected crop on the other side of the merger, or in the middle of the merger, or it may split the collected crop into two large windrows located on opposite sides of the merger.

SUMMARY OF THE INVENTION

Problems can occur when windrow mergers are used on fields or terrain that is uneven, e.g. over a length scale of a few feet. Due to the unevenness, the pickup head of the merger may in some places hover above ground level, thus failing to pick up crop, while in other places it may be dragged into the dirt, again failing to pick up crop but also doing damage to the field and possibly to the merger itself as well. Merger manufacturers have addressed the problem of uneven field conditions by mounting the pickup heads to the main frame of the merger with suspension systems that allow the pickup head to rise and fall relative to that frame, thus allowing the pickup head to more closely track the contour of the field.

We have found that even after equipping a merger with a suspension system allowing the head to move up and down, operational problems can still remain, especially when the range of head movement is substantial, e.g., more than just a few inches between its lowest and highest positions. In this regard we have found that the pickup head can exert substantially different downward forces on the ground as a function of the height of the head. For example, at the maximum head height the head may exert a first net force or pressure on the ground, and at the minimum head height the head may exert a second net force that is substantially different (greater or less) than the first net force. This leads to the challenge of how to design the merger such that the pickup head follows the contour of the terrain closely and quickly enough so it doesn't leave patches of crops lying on the field, while also preventing the head from pressing too heavily against the ground in other places in a way that would produce field scars or otherwise damage the terrain as the merger moves along, in addition to producing unnecessary friction and wear and tear on the skid shoes.

To address these and/or other issues, we have developed new types of windrow mergers that may employ one or more new operational or design features as described further below. One such feature maintains a substantially constant force or pressure between a pickup head of the merger and the terrain regardless of a height of the head. Another such feature maintains a substantially constant hydraulic pressure in a hydraulic actuator that connects the pickup head to a frame assembly of the merger. Still another feature employs a hydraulic pump driven by a power takeoff (PTO) of the tractor to charge and discharge a hydraulic actuator arranged to raise and lower the pickup head of the merger between an upper limit and a lower limit. One, some, or all of these features, and other disclosed features, may be employed individually or together in a given embodiment of a windrow merger.

We therefore disclose herein, among other things, windrow mergers that include a frame assembly, a pickup head, an actuator, and a control system. The pickup head may include a head frame, and a pickup assembly and a conveyor assembly supported by the head frame, the pickup head also including one or more skid shoes attached to the head frame and adapted to contact terrain below the pickup head. The head frame may be adjustably connected to the frame assembly to allow the pickup head to rise and fall relative to the frame assembly between an upper limit and a lower limit. The actuator may be connected between the head frame and the frame assembly such that changes in a height of the pickup head relative to the frame assembly correspond to changes in length of the actuator. The control system may be coupled to the actuator to control the actuator to maintain a substantially constant force between the one or more skid shoes and the terrain regardless of the height of the pickup head between the upper limit and the lower limit.

The actuator may be a hydraulic actuator, and the control system may maintain a substantially constant hydraulic pressure in the hydraulic actuator. The control system may be configured to dynamically control the hydraulic pressure to a set point pressure. The merger may be adapted to connect to a tractor or the like, and may further include an input panel for mounting in the tractor to allow an operator to change the set point pressure. The control system may maintain the substantially constant hydraulic pressure by monitoring a pressure associated with the hydraulic actuator and adding or releasing hydraulic fluid to or from the hydraulic actuator in response to determining that the monitored pressure deviates from a set point pressure by more than a predetermined amount. The predetermined amount may be a given pressure increment, such as 10, 20, 30, 40, or 50 psi, or it may be a percentage of the set point, e.g., 1%, or 2%, or 3%, or 4%, or 5% of the set point.

The merger may also include an accumulator hydraulically connected to the hydraulic actuator, and the control system may maintain a substantially constant hydraulic pressure in the accumulator. The control system may include a flowing hydraulic fluid constantly flowing through a flow path, and one or more electronically actuatable valves configured to charge the accumulator by redirecting the flowing hydraulic fluid to the accumulator or to discharge the accumulator by releasing hydraulic fluid from the accumulator into the flowing hydraulic fluid to maintain the substantially constant hydraulic pressure in the accumulator. The control system may also include a pressure sensor connected to monitor a hydraulic pressure of the accumulator and to control the one or more electronically actuatable valves. The one or more electronically actuated valves may include a solenoid valve or a proportional valve or both a solenoid valve and a proportional valve. The control system may also include a hydraulic pump mounted to the frame assembly and driven by a tractor PTO to cause the flowing hydraulic fluid to constantly flow through the flow path.

The merger may also include a second pickup head including a second head frame, and a second pickup assembly and a second conveyor assembly supported by the second head frame, the second pickup head also including one or more second skid shoes attached to the second head frame and adapted to contact terrain below the second pickup head, the second first head frame being adjustably connected to the frame assembly to allow the second pickup head to rise and fall relative to the frame assembly between a second upper limit and a second lower limit. A second actuator may be connected between the second head frame and the frame assembly such that changes in a height of the second pickup head relative to the frame assembly correspond to changes in length of the second actuator. The control system may also be coupled to the second actuator to control the second actuator to maintain a substantially constant second force between the one or more second skid shoes and the terrain regardless of the height of the second pickup head between the second upper limit and second lower limit.

The first and second actuators may be hydraulic actuators, and may be hydraulically connected to each other. The control system may maintain a substantially constant hydraulic pressure in the first and second actuators. The merger may also include an accumulator hydraulically connected to the first and second actuators, and the control system may maintain a substantially constant hydraulic pressure in the accumulator.

A distance between the upper limit and the lower limit of the first and/or second pickup head may be at least 8 inches, or in a range from 10 to 30 inches. The control system may include a hydraulic pump mounted to the frame assembly and driven by a tractor PTO.

We also disclose windrow mergers that include a frame assembly, a pickup head, an accumulator, and a control system. The pickup head may be adjustably connected to the frame assembly by a hydraulic actuator to allow the pickup head to rise and fall relative to the frame assembly between an upper limit and a lower limit, and the accumulator may be hydraulically connected to the hydraulic actuator. The control system may be adapted to dynamically charge and discharge the accumulator to maintain a substantially constant hydraulic pressure in the accumulator.

We also disclose windrow mergers for attachment to a tractor or the like that has a power take off (PTO) drive, the windrow merger including a frame assembly, a pickup head, a hydraulic pump, and a hydraulic path, where the frame assembly includes a hitch assembly and a tail assembly, the hitch assembly configured to mount to the tractor and couple to the PTO, and the tail assembly having one or more wheels attached thereto to allow the merger to roll across terrain. The pickup head may be adjustably connected to the frame assembly by a hydraulic actuator to allow the pickup head to rise and fall relative to the frame assembly between an upper limit and a lower limit. The hydraulic pump may be mounted to the frame assembly and driven by the PTO of the tractor. The hydraulic path may extend from the hydraulic pump to the hydraulic actuator.

We also disclose numerous related methods, systems, and articles.

These and other aspects of the present disclosure will be apparent from the detailed description below. In no event, however, should the above summaries be construed as limitations on the claimed subject matter, which subject matter is defined solely by the attached claims, as may be amended during prosecution.

BRIEF DESCRIPTION OF THE DRAWINGS

The inventive articles, systems, and methods are described in further detail with reference to the accompanying drawings, of which:

FIG. 8C is measured pressure and position data that was collected on a merger equipped with this control system.

In the figures, like reference numerals designate like elements.

DETAILED DESCRIPTION OF ILLUSTRATIVE EMBODIMENTS

The goal of any farm-related harvesting implement is to do the job required while impacting the environment as little as possible. Windrow mergers have been used in the farming industry for many years with great overall success, but, as with most complex pieces of machinery, there is always room for improvement. We describe herein features that can be used individually or in combination on a windrow merger that will allow the merger to perform its job as depicted schematically in FIG. 1 in an improved fashion, particularly in cases where the field being harvested has contours or a topography that is rough, curved, or otherwise uneven, and to carry out that job with reduced harm to the field.

At least some of the features relate to the fact that as a windrow merger is pulled across the field, sliding contact between the ground and the skid shoes at the bottom of each pickup head generates significant heat through friction, and may also produce field scarring depending on soil conditions and the force of the skid shoes against the ground. Reducing the frictional heat by reducing the force or pressure of the skid shoes against the ground, by transferring more of the weight of the pickup head to the frame and ultimately to the merger's set of implement wheels and tires (which roll across the ground with much less friction than the sliding action of the skid shoes) would be desirable. One challenge in doing this is how to "suspend" the pickup head off the ground as much as possible (but not completely, since at least some force of the head against the ground is desirable) and still allow it to follow extreme terrain that may be encountered during off-highway implement use. It would also be desirable to accomplish this weight transfer dynamically or on-the-fly while the head moves up and down (between its upper and lower displacement limits) with the terrain, to assure optimal performance during the entire time the merger moves across the field.

Before describing all these features in detail, we begin with a discussion of some basic considerations and features of windrow mergers.

Figure 2:
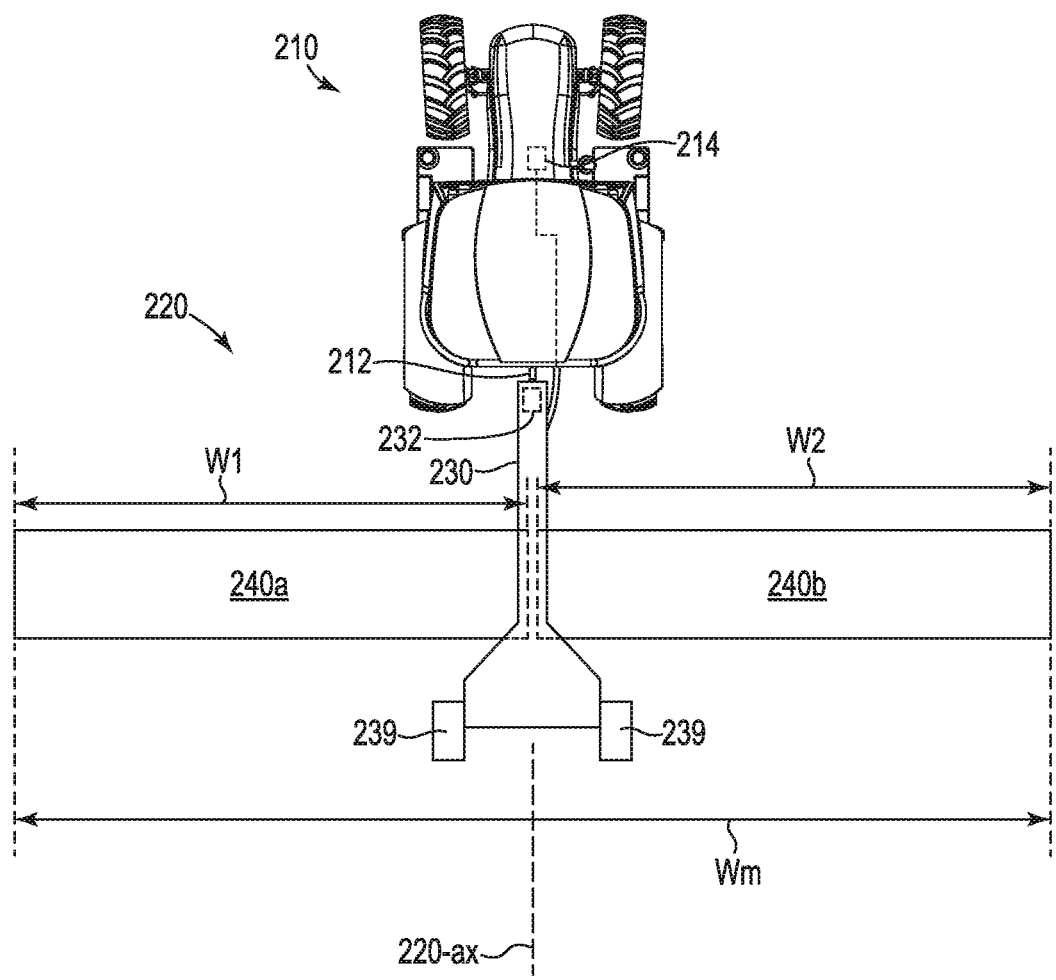
FIG. 2 is a schematic top view of a two-headed merger connected to a tractor.

In FIG. 2, we see a schematic top view of a two-headed windrow merger 220 connected to a tractor 210. The pickup heads 240a, 240b of the merger 220 are shown schematically as boxes, but the reader will understand that each such head would typically include at least a pickup assembly, a conveyor assembly, and a deflector assembly. Each pickup head would also typically include one or more skid shoes that contact the ground. Support for each pickup head is provided by its respective skid shoe(s) in combination with its attachment to a frame assembly 230, as discussed further below. Wheels 239 may be provided on a tail section of the frame assembly or elsewhere as desired. As a general matter, the wheels roll across the field with less friction than the sliding action of the skid shoe(s), and with little or no damage to the field.

Figure 1:
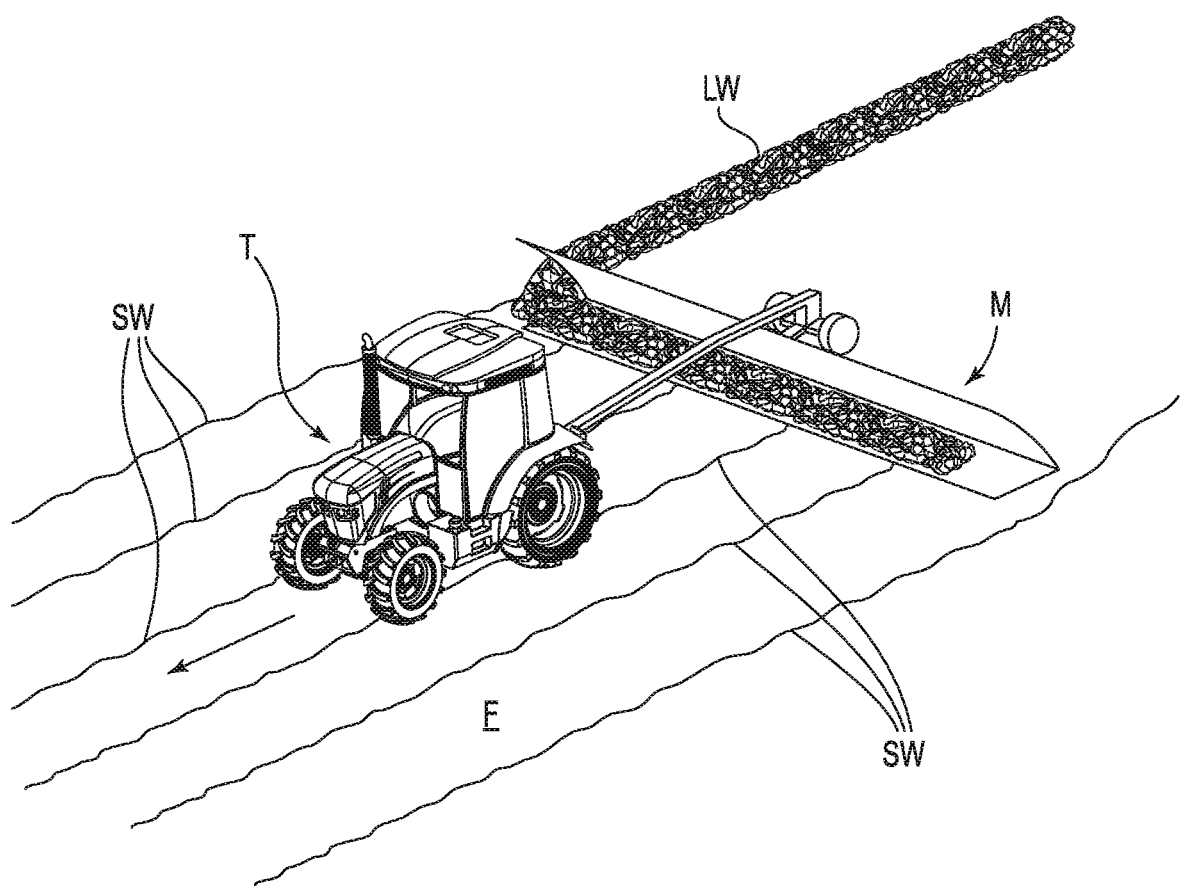
FIG. 1 is a schematic overhead view of a merger in operation in a field of harvested crop.

The pickup heads 240a, 240b are characterized by widths W1, W2 respectively, which may be physical widths and/or working widths. Any loose crops or similar debris lying on the field in these regions are picked up and processed by the merger 220, e.g., conveyed and deposited on one side of the merger as the tractor advances across the field, as shown in FIG. 1. It is usually desirable to minimize the gap between the pickup heads. In such cases, the effective working width Wm of the merger as a whole is approximately equal to the sum of the widths of the individual heads, that is, W1+W2 in the two-headed embodiment shown. In other embodiments the merger 220 may have other numbers of pickup heads, e.g., three or four, in which case the working width of the merger may be approximately equal to the sum of the widths of all the individual heads. The pickup heads may be designed to have any desirable head width, e.g. typically 26 feet or 28 feet for a given head. For a two-headed merger, a 28 foot head width is desirable to allow the merger to combine five smaller windrows (see SW in FIG. 1) into one output windrow (see LW in FIG. 1).

Most tractors 210 are configured with a suitable hitch, such as a 3-point hitch, with which to make a strong, pivotable attachment to a front portion of the frame 230 of the merger. The tractor 210 may also be configured with an on-board hydraulic pump 214 and associated hydraulic fluid reservoir, which can be accessed by the merger 220 via a rear access (RA) remote and suitable tubing at the back of the tractor 210 as shown schematically. The tractor 210 is also assumed to be equipped with a general purpose power takeoff (PTO), indicated by reference number 212. The PTO 212 can be used to drive a hydraulic pump 232 which is included as part of the merger 220 and mounted on the frame assembly 230 at a front portion thereof. Similarities and differences between the PTO-driven hydraulic pump 232 of the merger 220 and the hydraulic pump 214 on board the tractor 210 will be discussed further below.

Often, the main components of a merger will be arranged in a symmetrical fashion about a longitudinal axis of the merger. Thus, for example, a vertical plane passing through the longitudinal axis 220-ax in FIG. 2 may substantially bisect the merger 220 to produce mirror symmetry at least with regard to its major components such as the pickup heads 240a, 240b, wheels 239, and main portions of the frame assembly 230. In some cases, however, such symmetry may be neither desirable nor practical. Both symmetrical mergers and asymmetrical mergers are contemplated herein.

Figure 3A:
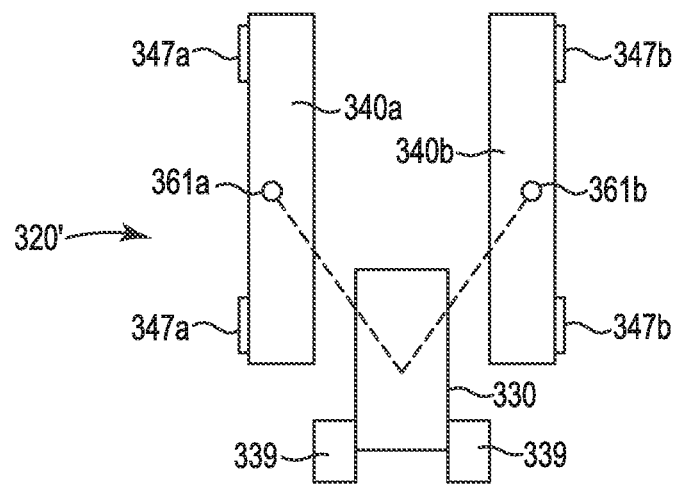
FIG. 3A is a schematic end or rear view of a merger with its pickup heads in a folded-up or transport configuration.
Figure 3B:
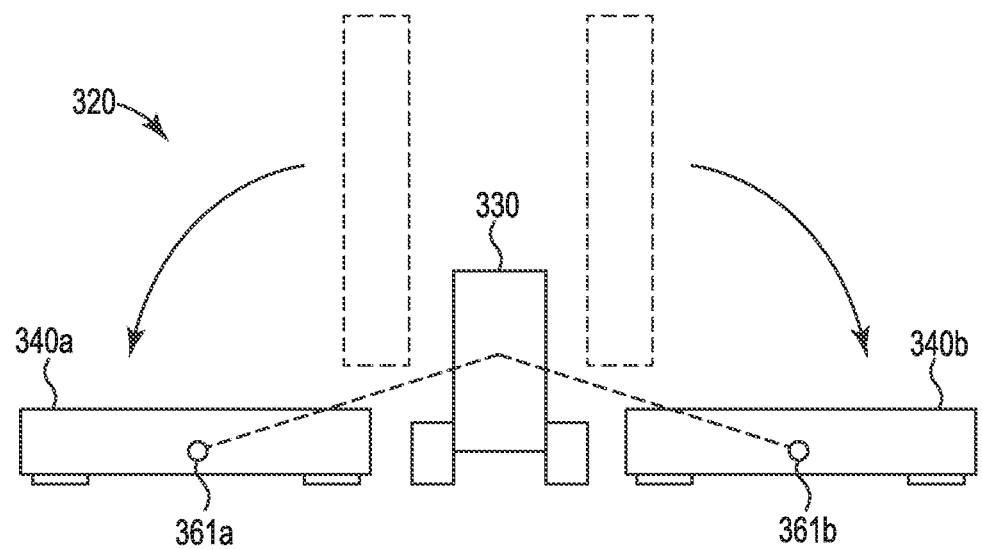
FIG. 3B is a schematic view of the same merger showing how the heads fold down into a working configuration.
Figure 3C:
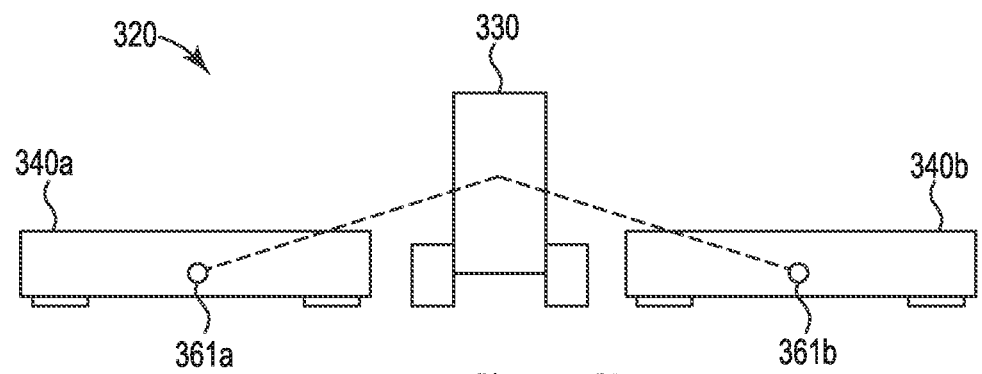
FIG. 3C is a schematic view of the same merger in the working configuration.

FIGS. 3A through 3C illustrate one type of motion of the pickup heads of a merger, namely, pivotal movement between a transport configuration and a working configuration of the merger. These are provided merely to contrast with the strictly vertical translational motion provided by preferred suspension assemblies, as well as to illustrate an otherwise conventional feature that can be included in the disclosed mergers.

Thus, in FIG. 3A, a windrow merger 320' includes two pickup heads 340a, 340b connected to a frame assembly 330 with wheels 339. Configurable mechanical support structures (shown only schematically as dashed lines for generality, but known in the art) connect the pickup heads to the frame assembly. In the configuration shown, the mechanical support structures hold the pickup heads in an approximately vertical orientation, close to the frame assembly 330. This minimizes the overall width dimension of the merger 320' to allow it to fit on a standard roadway e.g. when it is being transported between a farmhouse and a field. This arrangement is therefore aptly named the "transport configuration".

The configurable mechanical support structures may connect to the pickup heads at respective spindle assemblies 361a, 361b. Placing the spindle assemblies at or near the center of mass of the respective pickup heads 340a, 340b allows for easier manipulation and movement of the pickup heads by the mechanical support structures. Note that in this transport configuration the skid shoes 347a, 347b of the pickup heads 340a, 340b are high above the ground.

After the tractor brings the merger to the field where pickup work is to be done, the operator unfolds the pickup heads from their transport orientation to a working orientation with a pivot-like motion as indicated by the curved arrows in FIG. 3B. This is typically accomplished by actuators that are part of the configurable mechanical support structure. Where such actuators are hydraulic, they have historically been driven by the tractor hydraulic system (see on-board pump 214 in FIG. 2). The merger 320 in its resultant working configuration, with the pickup heads 340a, 340b substantially horizontally oriented and the skid shoes 347a, 347b in contact with the underlying ground or terrain, is shown schematically in FIG. 3C. (For labeling purposes, for clarity, the merger is labeled 320' when in its transport configuration and 320 when in its working configuration.) For simplicity, the pickup heads 340a, 340b are shown schematically in FIGS. 3B and 3C as being entirely located on opposite sides of the frame assembly 330 of the merger and thus with a large gap in between. The reader will understand that in practice the pickup heads would typically be much closer to each other, e.g. as shown in FIG. 2, or in FIG. 6A below.

Figure 4A:
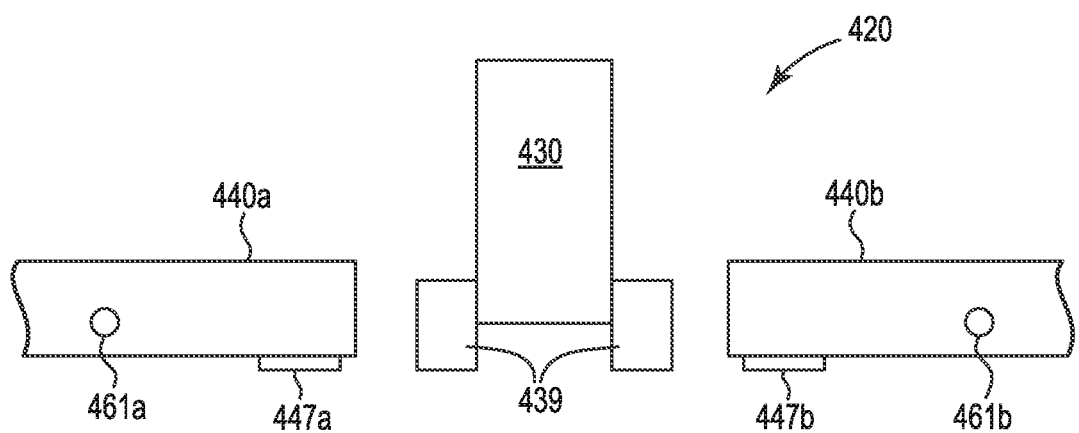
FIG. 4A is a schematic end or rear view of a portion of a merger in the working configuration and with both pickup heads at a neutral height position.
Figure 4B:
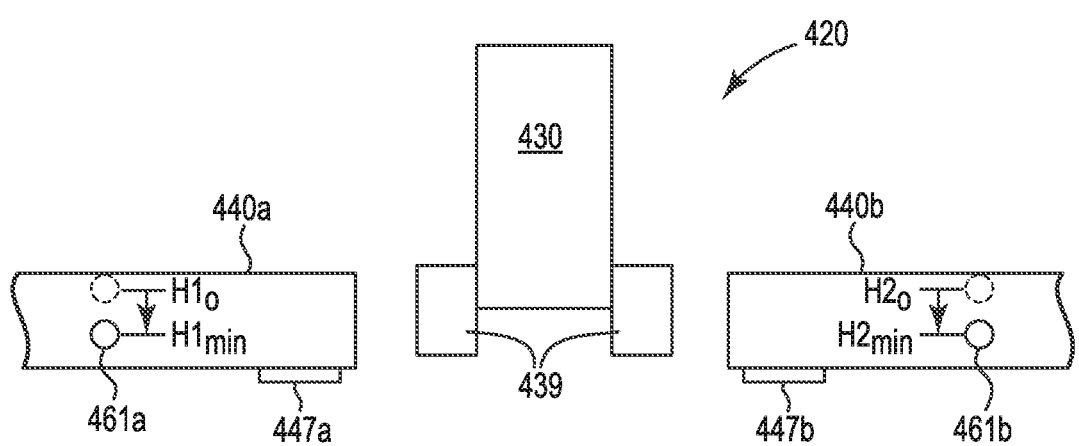
FIGS. 4B and 4C are schematic views of the same merger still in the working configuration but with both pickup heads at a lowest height position and a highest height position respectively.
Figure 4C:
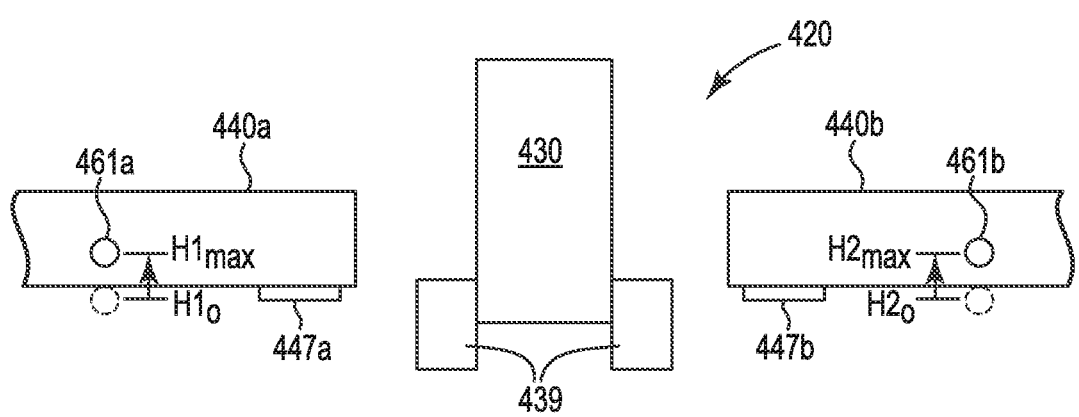
Figure 6A:
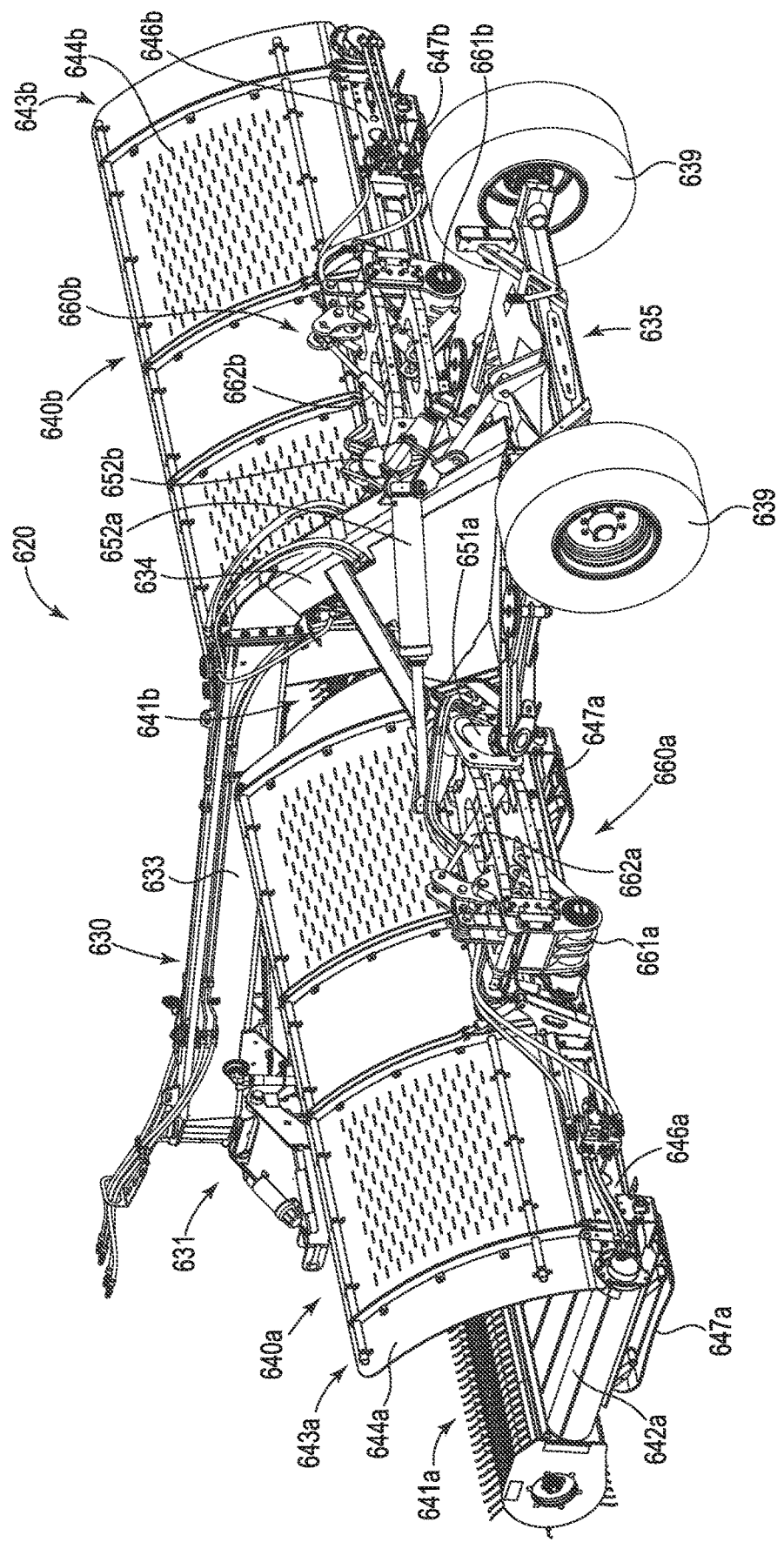
FIG. 6A is a perspective view of a merger in a working configuration.

Turning then to FIGS. 4A-4C, we see there a series of figures that illustrate schematically the substantially vertical up-and-down (translational) motion of the pickup heads, relative to the frame assembly of the merger, that is pertinent to some of the disclosed constant force or weight transfer techniques described further below. These are schematic end or rear views like those of FIGS. 3A-3C, but where the far end of each pickup head is cut off for convenience. The pickup heads would typically be much closer to each other e.g. as shown in FIG. 2 or 6A.

Thus, in FIG. 4A, we have a windrow merger 420 in its working configuration. The merger 420 has a frame assembly 430 equipped with wheels 439. Mechanical support structures (not shown) connect pickup heads 440a, 440b to the frame assembly 430. The support structures preferably include actuator(s), pivot point(s), or other conventional elements that allow the merger to transition back and forth between the illustrated working configuration and a transport configuration, similar to the illustrations of FIGS. 3A-3C. More importantly, the support structures include a suspension assembly configured to allow the first pickup head to rise and fall relative to the frame assembly between an upper limit and a lower limit of head travel while it picks up crop from the field. One such suitable suspension assembly is described further below, but other designs can also be used.

In combination, the mechanical support structure and the suspension assembly are configured to provide an upward force on each pickup head (thus transferring some of the downward force from the weight of the pickup head to the frame assembly 430 and wheels 439) such that only a portion of the weight of the pickup head is transferred to the ground through the skid shoes 447a, 447b. Attachment of the respective suspension assemblies to the pickup heads 440a, 440b, and the location of such upward forces, may be at respective spindle assemblies 461a, 461b which may be located at or near the center of gravity of the respective pickup heads.

In FIG. 4A, the pickup heads 440a, 440b are both shown in their neutral positions with regard to head height, i.e., where the height of each head is between an upper limit and a lower limit of head travel. We may designate this neutral head height as $H_0$, or $H1_0$ for head 440a and $H2_0$ for head 440b. The neutral height $H_0$ may be half way between the upper and lower limits, or it may be closer to one than the other.

FIGS. 4B and 4C illustrate how, through action of the respective suspension assemblies that connect the respective heads 440a, 440b to the frame assembly 430, the head can be raised and lowered with respect to the frame assembly and thus also with respect to the wheels, ground, etc., all while the merger is still in the working configuration. The amount of raising and lowering is shown in the figure with respect to the spindle assemblies, but the reader will understand that the skid shoes 447a, 447b and the other elements of the respective pickup heads may be raised or lowered in unison with the spindle assembly. (In some cases the mechanical attachment may allow for a limited amount of pivoting of a given pickup head about the axis of the spindle assembly to account for lateral variations in terrain height, e.g. up to ±10 degrees, or up to ±6 degrees, or up to ±5 degrees, such that a skid shoe on one side of the pickup head may be higher than a skid shoe on the other side of the pickup head.). Thus, FIG. 4B shows the merger 420 with both pickup heads at their lowest head heights $H1_{min}$, $H2_{min}$, and FIG. 4C shows the merger with both pickup heads at their highest head heights $H1_{min}$, $H2_{min}$ f.

Note that regardless of whether there are only two pickup heads on the merger or some other number of heads, the heads need not, and preferably do not, all move up or down in unison with each other. Instead, each pickup head preferably has its own suspension assembly that allows it to rise and fall as necessary to follow the particular terrain underneath it as the merger advances across the field, independent of the up-and-down motion of the other pickup head(s). The unique features described more fully below are broadly applicable to windrow mergers regardless of the number of heads on the merger, whether it be only one, or two, or three, or four or more.

Figure 5A:
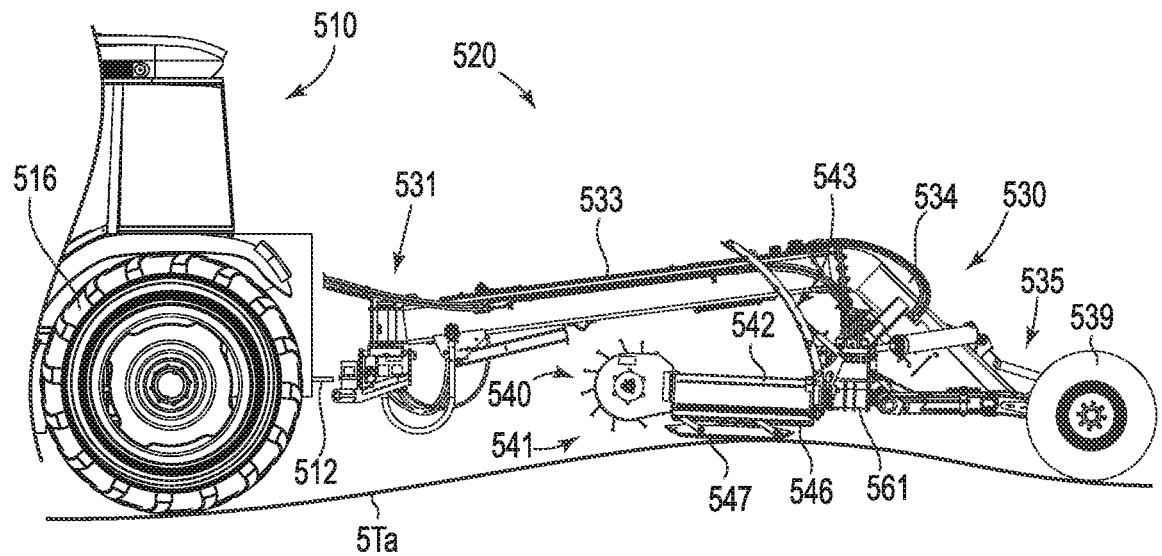
FIG. 5A is a schematic side view of a merger in a working configuration and with a pickup head in highest height position to accommodate a first terrain profile.
Figure 5B:
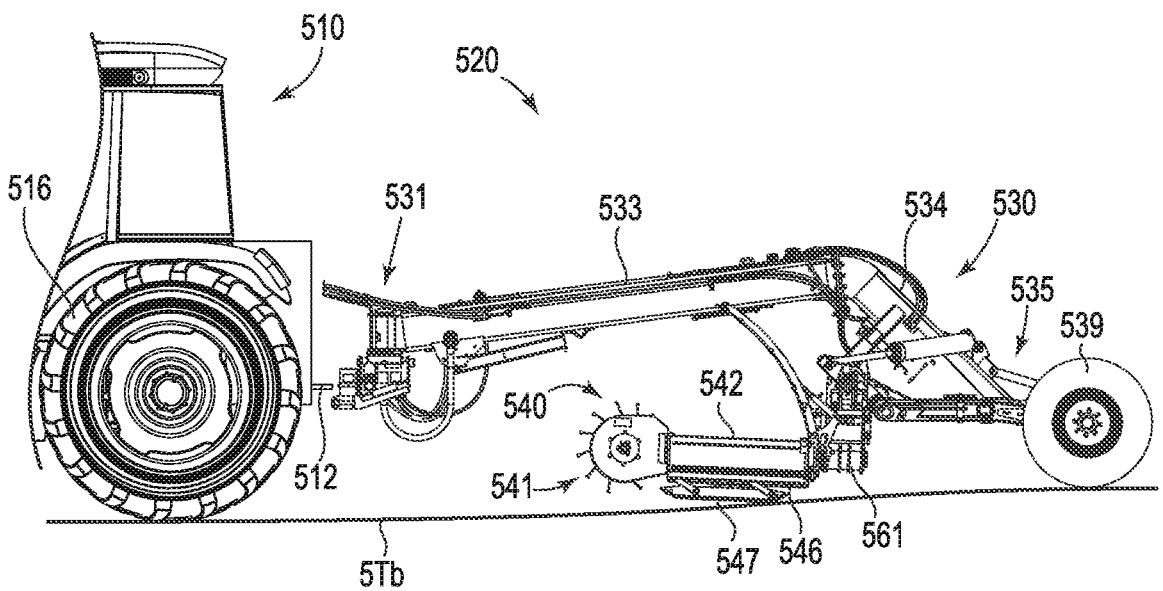
FIG. 5B is a similar view of the same merger with the pickup head in a lowest height position to accommodate a second terrain profile.

Side views of a windrow merger with its pickup heads at a maximum height and a minimum height are shown in FIGS. 5A, 5B, respectively, to illustrate pertinent relationships that give rise to the need for head height movement. Of some importance in this regard is the terrain profile from the rear wheel of the tractor to the (rear) wheel of the merger, and the location of the pickup head's skid shoe between those two points. Approximate relevant distances between these various points are typically on the order of a few feet, e.g., 15 to 20 feet from the rear wheel of the tractor to the rear wheel of the merger, or 11 to 16 feet from the rear wheel of the tractor to the skid shoe contact point, or 3 to 6 feet, or 4 or 5 feet, from the skid shoe contact point to the rear wheel of the merger. Changes in ground contour over these distances are therefore relevant to the disclosed techniques.

The side views of FIGS. 5A and 5B show more details of the merger design than the schematic drawings discussed above. The illustrated windrow merger 520 thus includes a frame assembly 530 and a pickup head 540 connected to the frame assembly by a mechanical support structure that includes a suspension assembly. The merger 520 connects to, and is pulled forward by, a tractor 510 or the like which has a rear wheel 516, a PTO 512, and other elements not shown. A portion of the frame assembly 530 referred to as a hitch assembly 531 pivotably connects the merger 520 to the tractor 510 at the tractor's 3-point hitch (not shown). Other portions of the frame assembly 530 include a pole member 533, a main frame 534, and a tail assembly 535, to which are attached trailing wheels 539. The pickup head 540 includes a pickup assembly 541, a conveyor assembly 542, and a deflector assembly 543, which may all be supported by a head frame 546. Attached to the underside of the head frame 546 are one or more skid shoes 547 for making contact with the ground. The suspension assembly connects the pickup head 540 to the frame assembly 530 via a spindle assembly 561 as described above.

In FIG. 5A the profile of the underlying terrain 5Ta is curved or uneven in such a way that the skid shoe 547 must be relatively higher, e.g., closer to the pole member 533, in order to contact the ground without too much force. In FIG. 5B (e.g. at a different place in the field being harvested) the profile of the underlying terrain 5Tb is curved or uneven in a different manner such that the skid shoe 547 must be relatively lower, e.g., farther away from the pole member 533, to reach the ground.

Even though it has been known for some time to equip windrow mergers with suspension systems to allow the pickup heads to move up and down with the terrain, as noted above we have observed that the force exerted by the head against the ground can vary considerably on such systems as a function of head height. This effect tends to be exacerbated when the range between the minimum head height and the maximum head height is large. Particularly challenging are designs in which the distance between minimum and maximum head height is at least 8 inches, or at least 10 inches, or at least 15 inches, or at least 17 inches, or at least 20 inches, or in a range from 8 to 30 inches, or 10 to 30 inches, or 15 to 25 inches.

More details of various elements of an exemplary windrow merger are shown in the perspective view of FIG. 6A. The illustrated windrow merger 620 thus includes a frame assembly 630 which is connected to two pickup heads 640*a*, 640*b* by a mechanical support structure that includes respective suspension assemblies 660*a*, 660*b*. The merger 620 is configured to connect to a tractor or the like (not shown). A portion of the frame assembly 630 referred to as a hitch assembly 631 pivotably connects the merger 620 to the tractor at the tractor's 3-point hitch (not shown). Other portions of the frame assembly 630 include a pole member 633, a main frame 634, and a tail assembly 635, to which are attached trailing wheels 639. Each of the pickup heads 640*a*, 640*b* includes a pickup assembly 641*a*, 641*b*, a conveyor assembly 642*a*, and a deflector assembly 643*a*, 643*b*, which may all be supported by respective head frames 646*a*, 646*b*. The deflector assemblies include deflector members 644*a*, 644*b* and deflector actuators which are configured to change the orientation angle of the deflector member relative to its respective conveyor. Attached to the underside of each of the head frames 646*a*, 646*b* are one or more skid shoes 647*a*, 647*b* for making contact with the ground. Large hydraulic actuators 652*a*, 652*b* are part of the folding system that is adapted to pivot the heads 640*a*, 640*b* between the transport configuration and the working configuration.

Figure 6B:
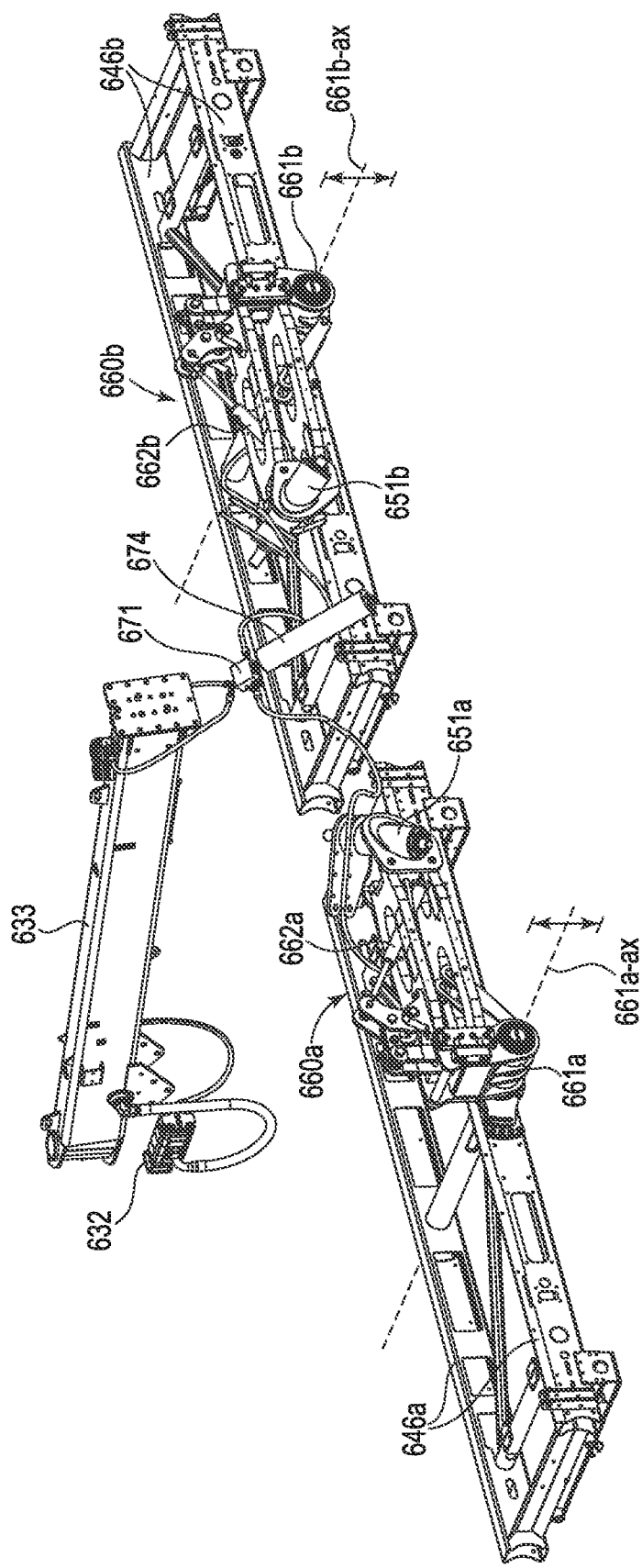
FIG. 6B is a perspective view of pertinent portions of the merger of FIG. 6A.

The suspension assemblies 660*a*, 660*b* are near mirror images of each other relative to a vertical plane passing through the longitudinal axis of the merger (see element 220-*ax* in FIG. 2). These suspension assemblies connect their respective pickup heads 640*a*, 640*b* to the frame assembly 630 via respective spindle assemblies 661*a*, 661*b* as described above. The suspension assemblies attach to the frame assembly at or near portions of the frame assembly referred to as pivot weldments 651*a*, 651*b* (FIG. 6B). Each suspension assembly 660*a*, 660*b* is designed to incorporate an actuator 662*a*, 662*b*. We may refer to these actuators as weight transfer actuators for reasons that will become apparent. As explained further below in connection with FIG. 6C, the suspension assembly may be designed such that there is a one-to-one correspondence between the head height of the pickup head (relative to the frame assembly of the merger) and the length of the weight transfer actuator, and vice versa. A consequence of this relationship is that when the skid shoes of a given pickup head are pressed against the ground for a certain terrain profile, adjusting the length of the weight transfer actuator in one direction can increase the force of the skid shoes on the ground, and adjusting the length in the opposite direction can decrease the force of the skid shoes on the ground.

FIG. 6B is a perspective view of the same merger shown in FIG. 6A but where elements have been removed, and some elements have been added to the figure, to more easily visualize the system elements that work together to control the head height of each pickup head, and that can also work together to control the forces exerted by the skid shoes on the underlying terrain. Thus, in FIG. 6B we can see the pole member 633 portion of the frame assembly 630 as well as the head frames 646*a*, 646*b*, the suspension assemblies 660*a*, 660*b*, the spindle assemblies 661*a*, 661*b*, the weight transfer actuators 662*a*, 662*b*, and the pivot weldment 651*a*. We can also see in FIG. 6B the pivot weldment 651*b*, which acts as an anchor point on the frame assembly for the other pickup head. A PTO-driven hydraulic pump 632 is also seen in FIG. 6B. The pump 632 corresponds to the pump 232 in FIG. 2, and would preferably be mounted in the hitch assembly portion of the frame assembly for easy coupling to the PTO of the tractor. Tubing for hydraulic fluid connects the pump 632 to a reservoir of hydraulic fluid (oil) located inside the pole member 633. Such tubing also connects the pump 632 to various mechanisms in each pickup head, and a section of the pump connects to the weight transfer actuators 662*a*, 662*b* through components including a control box 671 and an accumulator 674.

Longitudinal axes 661*a*-*ax*, 661*b*-*ax* are drawn respectively through the spindle assemblies 661*a*, 661*b*, and double-headed arrows are drawn to indicate the vertical displacement of each pickup head that is provided by its respective suspension assembly. Besides this, the spindle assemblies can be designed to allow a limited amount of rocking or pivoting of the pickup heads about the axis of the spindle assembly to account for lateral variations in terrain height as discussed above. Pivot angles of up to ±10 degrees, or up to ±6 degrees, or up to ±5 degrees, or otherwise, may be provided.

Figure 6C:
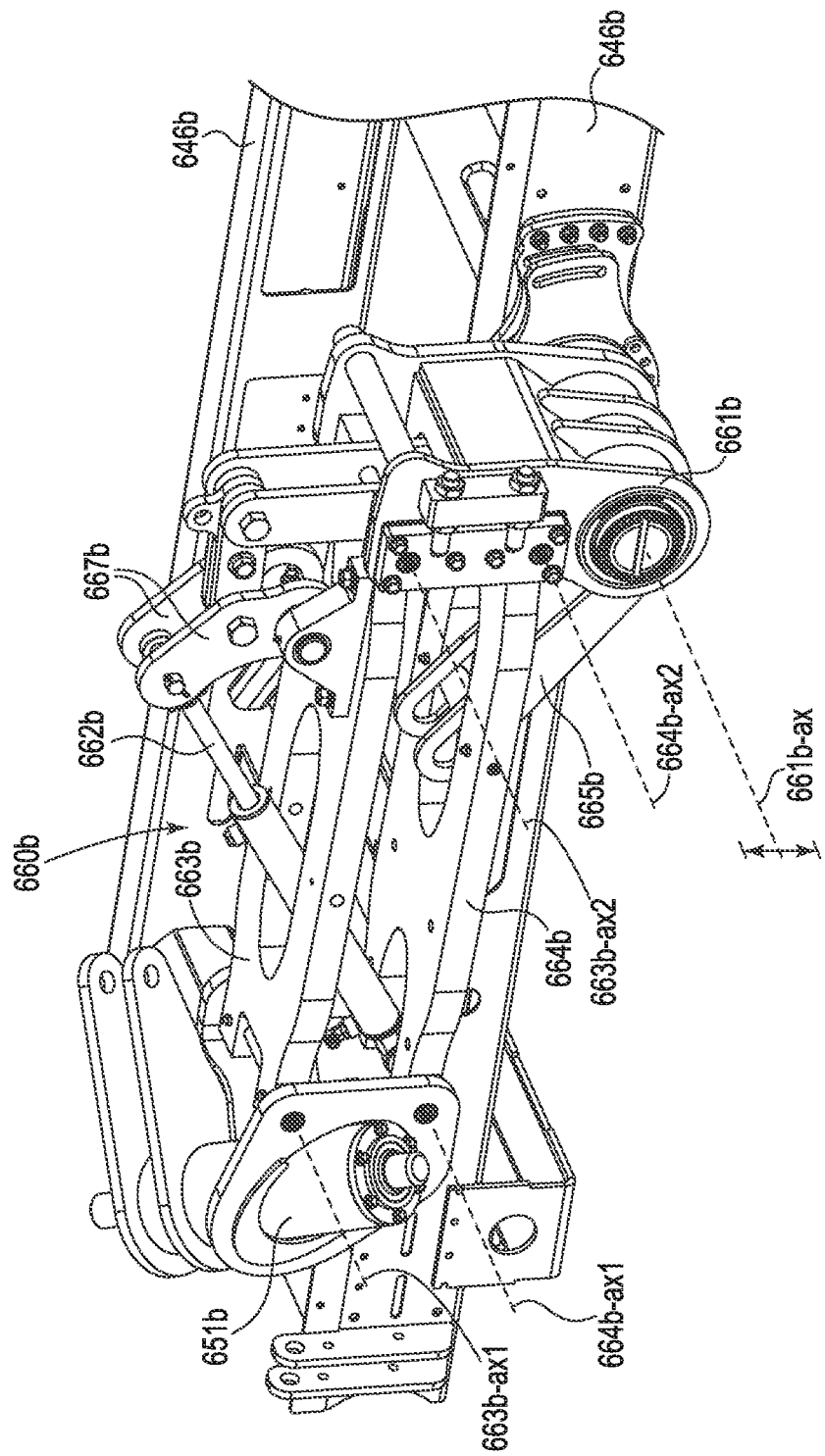
FIG. 6C is a perspective view of pertinent portions of a suspension assembly and neighboring elements for the merger of FIG. 6A.

FIG. 6C is a perspective view from another angle of pertinent portions of the suspension assembly 660*b* of FIGS. 6A and 6B, and neighboring elements. The pivot weldment 651*b* acts as an anchor point on the frame assembly 630 for the suspension assembly 660*b*. The other end of the suspension assembly 660*b* attaches to the head frame 646*b* for the pickup head 640*b* at the spindle assembly 661*b*. The suspension assembly includes a number of linkage elements that cooperate to produce a smooth vertical motion of the spindle assembly 661*b* as the weight transfer actuator 662*b* lengthens or shortens. The linkage elements include suspension links 663*b*, 664*b*, limiting strap 665*b*, and rocking arm 667*b*, connected as shown. The suspension links 663*b*, 664*b* may pivot about axes 663*b*-ax1, 663*b*-ax2, 664*b*-ax1, 664*b*-ax2 as shown to provide a so-called double wishbone suspension system. Such a system can provide a significant mechanical advantage to reduce stress or strain on the actuator 662*b*. An instantaneous center defined by such system may be located beyond the boundaries of the head frame 646*b* and the pickup head 640*b* itself. For example, for a pickup head width of 28 feet, the instantaneous center of a suspension assembly as shown in FIG. 6C may be located 14.775 feet from the spindle tube axis 661*b*-*ax*. Such a suspension assembly can also provide large head height displacement ranges if desired, including a range of 20 inches (+10 inches and −10 inches from a neutral position) if desired.

In the embodiment of FIG. 6C, lengthening of the actuator 662*b* corresponds to an upward motion of the spindle assembly 661*b* relative to the frame assembly 630, and shortening of the actuator 662*b* corresponds to a downward motion of the spindle assembly 661*b*. Stated differently, the position of highest pickup head height corresponds to the longest length of the actuator 662*b*, and the position of lowest pickup head height corresponds to the shortest length of the actuator 662b. Of course, the same relationships apply to the suspension assembly 660a for the pickup head 640a.

Figure 7:
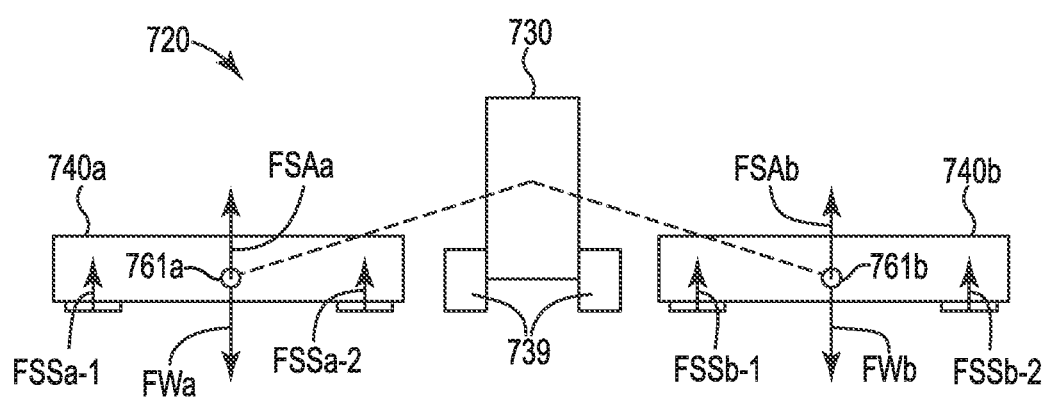
FIG. 7 is a schematic end or rear view of a merger showing vertical forces acting on each of the pickup heads.

Turning now to FIG. 7, we see there another schematic end or rear view of a merger 720 which may, if desired, incorporate some or all of the design details shown in FIGS. 6A-6C. Similar to the mergers shown in FIGS. 3C and 4A through 4C, the merger 720 includes a frame assembly 730 equipped with wheels 739. Mechanical support structures (not shown) which include suspension assemblies (not shown) as described above connect pickup heads 740a, 740b to the frame assembly 730. Two skid shoes that contact the ground are provided on each pickup head. (Alternatively, more or fewer than two such shoes could be used on each head if desired.) Vertical forces acting on each head are shown and labeled. On the head 740a: the downward force due to the total weight of the head is shown as force FWa; the upward force of the ground on the outer skid shoe is FSSa-1; the upward force of the ground on the inner skid shoe is FSSa-2; and the upward force exerted by the suspension system on the head frame is FSAa. (The upward force by the suspension system is balanced by an equal downward force acting on the frame assembly 730, transmitted through the mechanical support structures. In this manner, part of the weight of the pickup head could be said to be transferred to the frame assembly.) Likewise, on the head 740b: the downward force due to the total weight of the head is shown as force FWb; the upward force of the ground on the outer skid shoe is FSSb-1; the upward force of the ground on the inner skid shoe is FSSb-2; and the upward force exerted by the suspension system on the head frame is FSAb.

In a balanced condition (no instantaneous acceleration of the pickup head in a vertical direction), the vertical forces on each pickup head must balance. The downward force of gravity must therefore equal the sum of the upward forces on the skid shoes plus the upward force provided by the suspension system. Thus, by increasing or decreasing the upward force provided by the suspension system, the upward forces on the skid shoes (which are equal in magnitude to the downward forces of the skid shoes on the ground) can be decreased or increased, respectively. We can readily make use of these relationships to provide a control system that dynamically adjusts the suspension system to transfer more or less of the weight of the pickup head to the frame assembly so that the downward forces of the skid shoes of a given pickup head on the ground can be made constant or substantially constant for any given head height over the entire range from minimum to maximum head height.

Figure 8A:
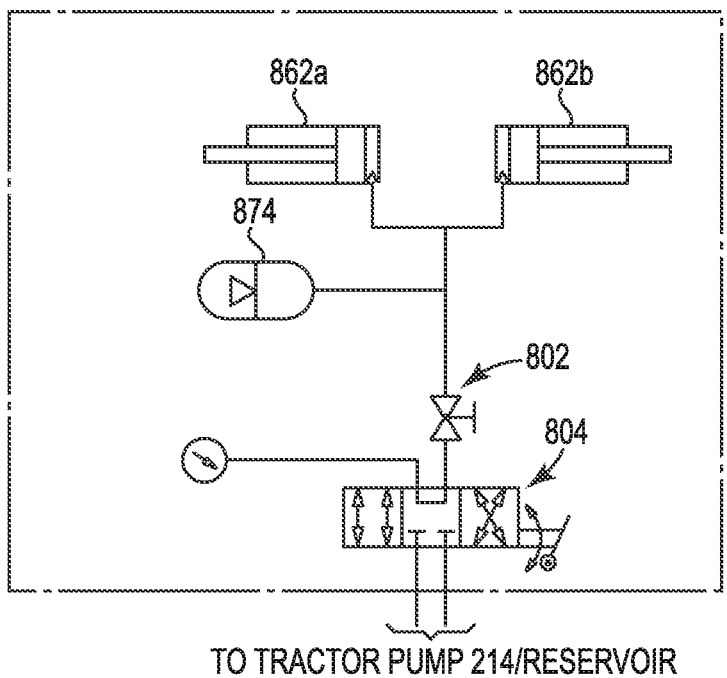
FIG. 8A is a schematic view of a known control system for a pickup head suspension system for a windrow merger.

Before describing such a system, we will first describe, for comparative purposes, a control system that does not provide such constant downward forces. Such a comparative system is shown in FIG. 8A. This comparative control system may be used with a windrow merger similar to the two-headed merger as shown in FIG. 6A, equipped with suspension systems of the type shown in FIG. 6C, except as provided herein. The control system of FIG. 8A utilizes hydraulic components, namely, two linear hydraulic actuators 862a, 862b, a hydraulic accumulator 874, a ball valve 802, a solenoid valve 804, and hydraulic connections and other components as indicated in FIG. 8A. The actuators 862a, 862b are used as weight transfer actuators in the same manner as actuators 662a, 662b, in suspension systems that are substantially the same as the suspension systems 662a, 662b of FIG. 6A. Before operating the merger in the field, the control system of FIG. 8A is first set up as follows: the system is hydraulically charged using the tractor's hydraulic pump (see element 214 in FIG. 2) and by appropriate manipulation of the solenoid 804 and ball valve 802 until the hydraulic pressure in the accumulator 874 and actuators 862a, 862b (all of which have the same hydraulic pressure by virtue of their interconnected hydraulic flow lines) reach a desired set point, whereupon the ball valve 802 is closed. The system then remains in this closed or sealed condition for the entire time the windrow merger is used to harvest a field, with no further need for charging by, or connection to, the tractor's hydraulic pump.

During operation of this control system of FIG. 8A so configured, the actuators 862a, 862b move in and out in response to forces exerted on them by the suspension systems 662a, 662b, which in turn are responsive to forces exerted by the ground on the skid shoes of the pickup heads. In this regard, each pickup head is free to move up and down between the minimum and maximum head height limits in order to follow the profile of the terrain during operation.

Figure 8B:
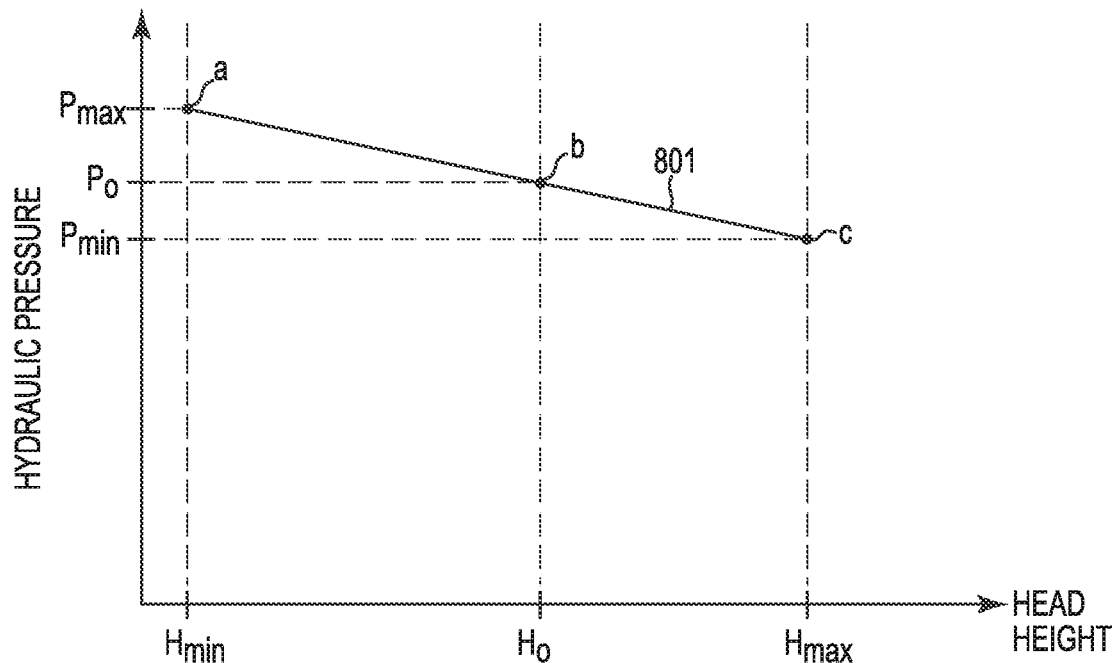
FIG. 8B is an idealized, schematic graph showing the performance of this control system.

This movement of the pickup heads causes corresponding motion of the actuators through the operation of the suspension systems, with a high head height corresponding to a long or extended actuator and a low head height corresponding to a short or compressed actuator. When both actuators 862a, 862b are compressed (both pickup heads are low), the hydraulic pressure in the closed system (and all of its fluidly connected components, namely, both actuators and the accumulator 874) rises. And when both actuators 862a, 862b are extended (both pickup heads are high), the hydraulic pressure in the closed system (and all its components) falls. This functionality is depicted in an idealized, schematic fashion in the graph of FIG. 8B. There, the curve or function 801 is substantially linear, or at least monotonic, from a point a, at a head height $H_{min}$, to a point b, at a head height $H_0$, to a point c, at a head height $H_{max}$. The y-axis of the graph represents the hydraulic pressure in the closed system, but that pressure is closely related to the net force exerted on the ground by the skid shoes on the pickup head whose height is plotted on the x-axis. Thus, neither the skid shoe force nor the hydraulic pressure is kept constant over the range of head heights with the control system of FIG. 8A.

This behavior was also observed and recorded in a windrow merger system that was field tested and that employed the control system described in connection with FIG. 8A. The measured data as a function of time is provided in FIG. 8C. Curve 803 is the measured hydraulic pressure in the closed system. Curves 805 and 807 are the measured head heights of the two pickup heads respectively. From time=0 to about time=24 seconds, the two heads are at relatively constant heights, and the hydraulic pressure is also relatively constant. Then at about time=24 seconds, both head heights rise and maintain higher values. At the same time, the hydraulic pressure falls and maintains a lower pressure. Then at about time=39 seconds, the heads abruptly return to their previous heights, and the hydraulic pressure abruptly returns to its previous value. (In the embodiment of the field test, there was an inverse relationship between the total skid shoe force on the ground versus the hydraulic pressure, where a higher hydraulic pressure corresponded to a lighter (smaller) skid shoe force, and a lower hydraulic pressure corresponded to a heavier (larger) skid shoe force.)

Figure 9A:
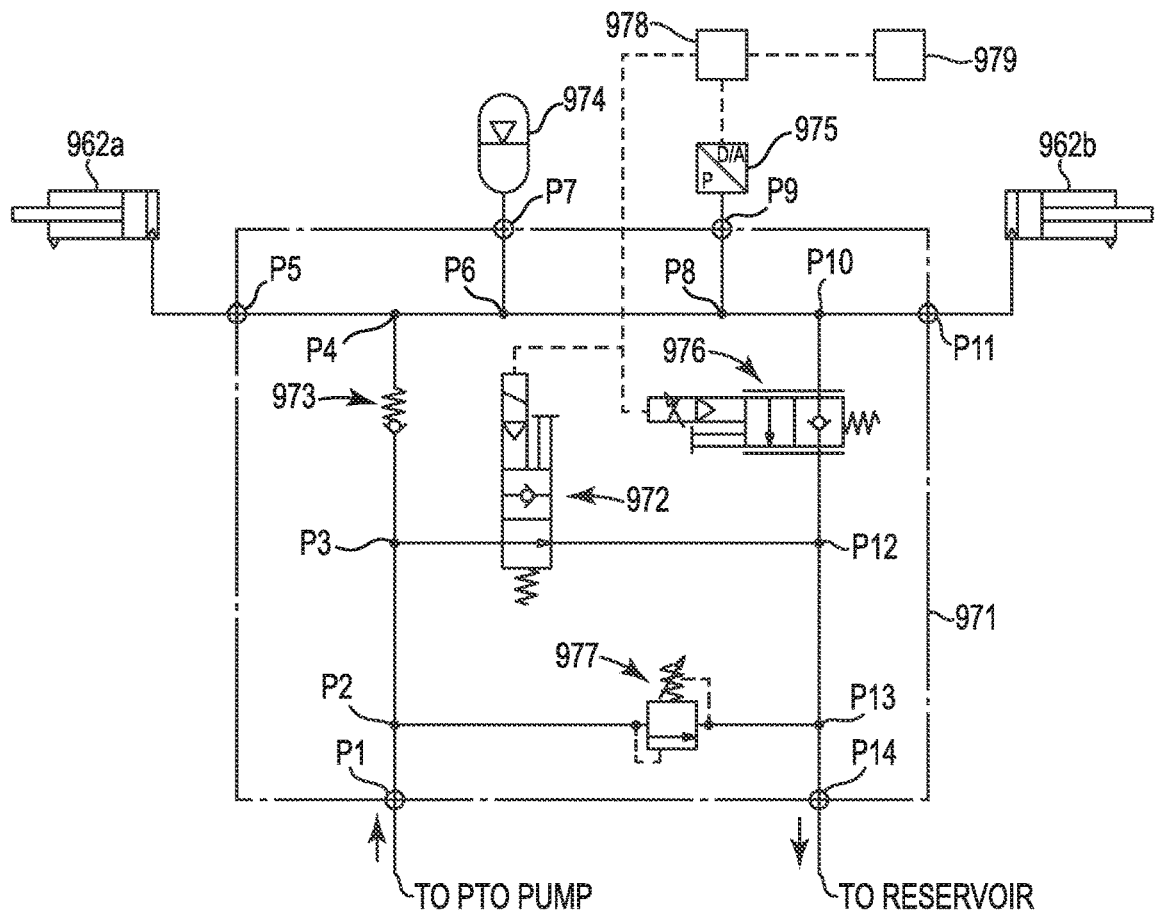
FIG. 9A is a schematic view of a control system as disclosed herein for a pickup head suspension system for a windrow merger.

In contrast to this, the hydraulic control system of FIG. 9A can be used in place of that of FIG. 8A to provide a more constant skid shoe force, a more constant hydraulic pressure, and other advantages. The control system of FIG. 9A may likewise be used with a windrow merger similar to the two-headed merger as shown in FIG. 6A, and equipped with suspension systems of the type shown in FIG. 6C. The control system of FIG. 9A may include a control box 971 and utilizes hydraulic components, namely, two linear hydraulic actuators 962a, 962b, a solenoid valve 972, a check valve 973, a hydraulic accumulator 974, a hydraulic pressure transducer or sensor 975, a hydraulic proportional valve 976, a relief valve 977, and hydraulic connections and other components as indicated in FIG. 9A. The actuators 962a, 962b are used as weight transfer actuators in the same manner as actuators 662a, 662b, in suspension systems that are substantially the same as the suspension systems 662a, 662b of FIG. 6A.

The system of FIG. 9A also preferably includes electronic components, namely, a programmable logic controller (PLC) or similar electronic controller 978, and an optional input panel or display 979 which may be configured for mounting in the tractor. The controller 978 communicates with the pressure sensor 975 to read the instantaneous pressure being sensed in the hydraulic line at point P9 and other connected points. The controller 978 also sends control signals to the valves 972, 976 to change their operational state when needed. Instructions that specify the interaction of the controller with the pressure sensor 975 and the valves 972, 976 may be stored in a memory component of the controller 978. The controller 978 may be mounted at any convenient place on the frame assembly of the merger, but may connect via wires or wirelessly to input panel 979 in the cab of the tractor. The input panel 979 may include a touch screen, mechanical buttons or switches, or other input devices to allow the operator (while sitting in the tractor cab) to set or change the set point hydraulic pressure of the control system, so as to set or change the desired skid shoe force on the ground. The input panel 979 preferably also includes a display to inform the operator what the set point pressure currently is.

Rather than connecting hydraulically to the pump of the tractor for a one-time charge, the control system of FIG. 9A calls for a constant flow of hydraulic fluid, and therefore connects instead to the PTO-driven hydraulic pump mounted to the frame assembly of the merger (see pump 232 in FIG. 2 and pump 632 in FIG. 6A), and discharge hydraulic fluid is routed to a suitable, preferably large, hydraulic reservoir such as the one described above located in the pole member 633. With the constant hydraulic fluid feed, and assuming a desired hydraulic set point pressure has been provided, the operation of the control system of FIG. 9A is as follows, keeping in mind that the actuators 962a, 962b will be jostled in and out in response to forces on the skid shoes by the uneven terrain.

In steady state, the pressure measured by sensor 975 equals the set point pressure. This pressure will be substantially the same at connection points P4, P5, P6, P7, P8, P9, P10, P11, and at both actuators 962a, 962b as well as the accumulator 974, since these are all fluidly connected with substantially no obstructions. In this condition, the solenoid valve 972 is in its "off" or "open" state, such that fluid from the PTO pump flows from point P1 to P2 to P3, through the open valve 972 to point P12, then to P13, P14, and out to the reservoir. The pressure at P4 is higher than at P3, thus the check valve 973 allows no flow from P3 to P4. The proportional valve 976 also remains closed.

In the case where the head heights of the pickup heads increase, causing the actuators to extend and the hydraulic pressure in the actuators and the accumulator 974 to drop, the control system quickly reacts to bring the hydraulic pressure back up to the set point. When the sensor 975 senses the pressure is below the set point, it activates the solenoid valve 972 to change it to a "closed" state, forcing the flowing hydraulic fluid through the check valve 973 to points P4 and beyond. This fluid will begin to fill the actuators and the accumulator 974, causing the pressure in those elements to rise. When the sensor 975 determines that the pressure has reached the set point, the solenoid valve is turned back to its "off" or "open" state, whereupon fluid flow through the check valve 973 stops again and steady state is achieved. Throughout this process the proportional valve 976 remains in its normal (closed) state, preventing hydraulic fluid from flowing from P10 to P12.

In the case where the head heights of the pickup heads decrease, causing the actuators to compress and the hydraulic pressure in the actuators and the accumulator 974 to rise, the control system quickly reacts to bring the hydraulic pressure back down to the set point. When the sensor 975 senses the pressure is above the set point, it activates the proportional valve 976 to allow flow through the valve from P10 to P12, thus partially discharging the actuators and the accumulator 974, causing the pressure in those elements to fall. When the sensor 975 determines that the pressure has reached the set point, activation of the proportional valve stops, and steady state is again achieved.

If at any time the valves 972, 976 become stuck in positions that cause a rapid increase in pressure in the control box 971, a relief valve 977 is provided to prevent catastrophic damage, allowing for a safe flow path from P2 to P13.

Figure 9B:
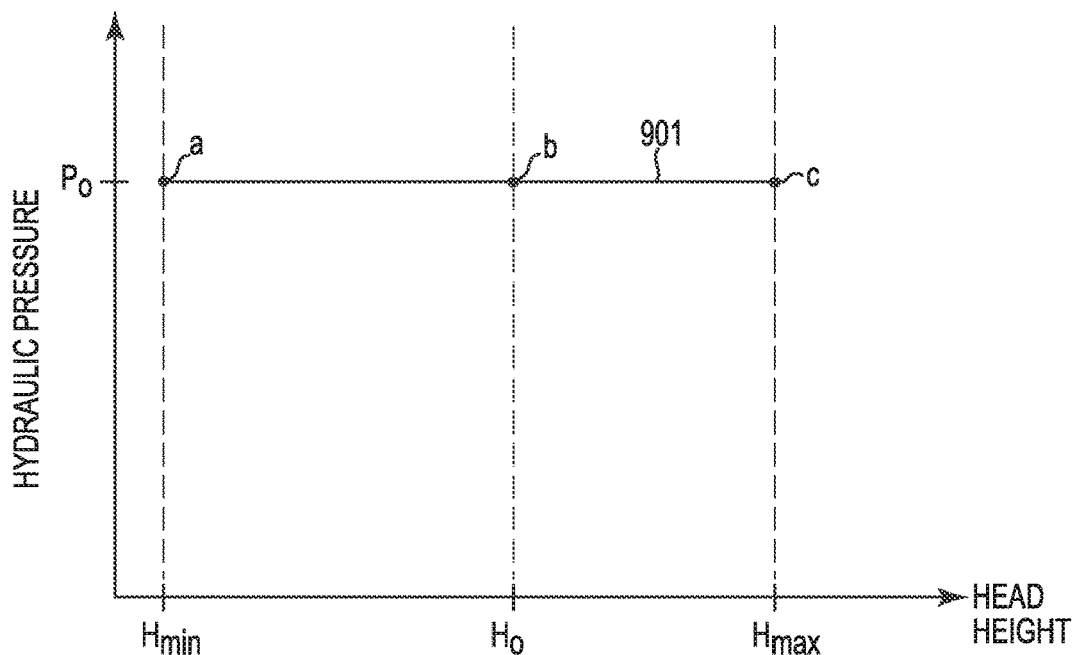
FIG. 9B is an idealized, schematic graph showing the performance of this control system.

This functionality, which is stored in digital instructions in a memory of the controller 978, is depicted in an idealized, schematic fashion in the graph of FIG. 9B, where the set point pressure is labeled as $P_0$. There, the curve or function 901 is a line of substantially zero slope, from a point a, at a head height $H_{min}$, to a point b, at a head height $H_0$, to a point c, at a head height $H_{max}$. The y-axis of the graph represents the (steady state) hydraulic pressure in the actuators 962a, 962b and the accumulator 974, but that pressure is closely related to the net force exerted on the ground by the skid shoes, as discussed above in connection with FIG. 8B. Thus, the skid shoe force and the hydraulic pressure are both kept substantially constant over the range of head heights.

Figure 9C:
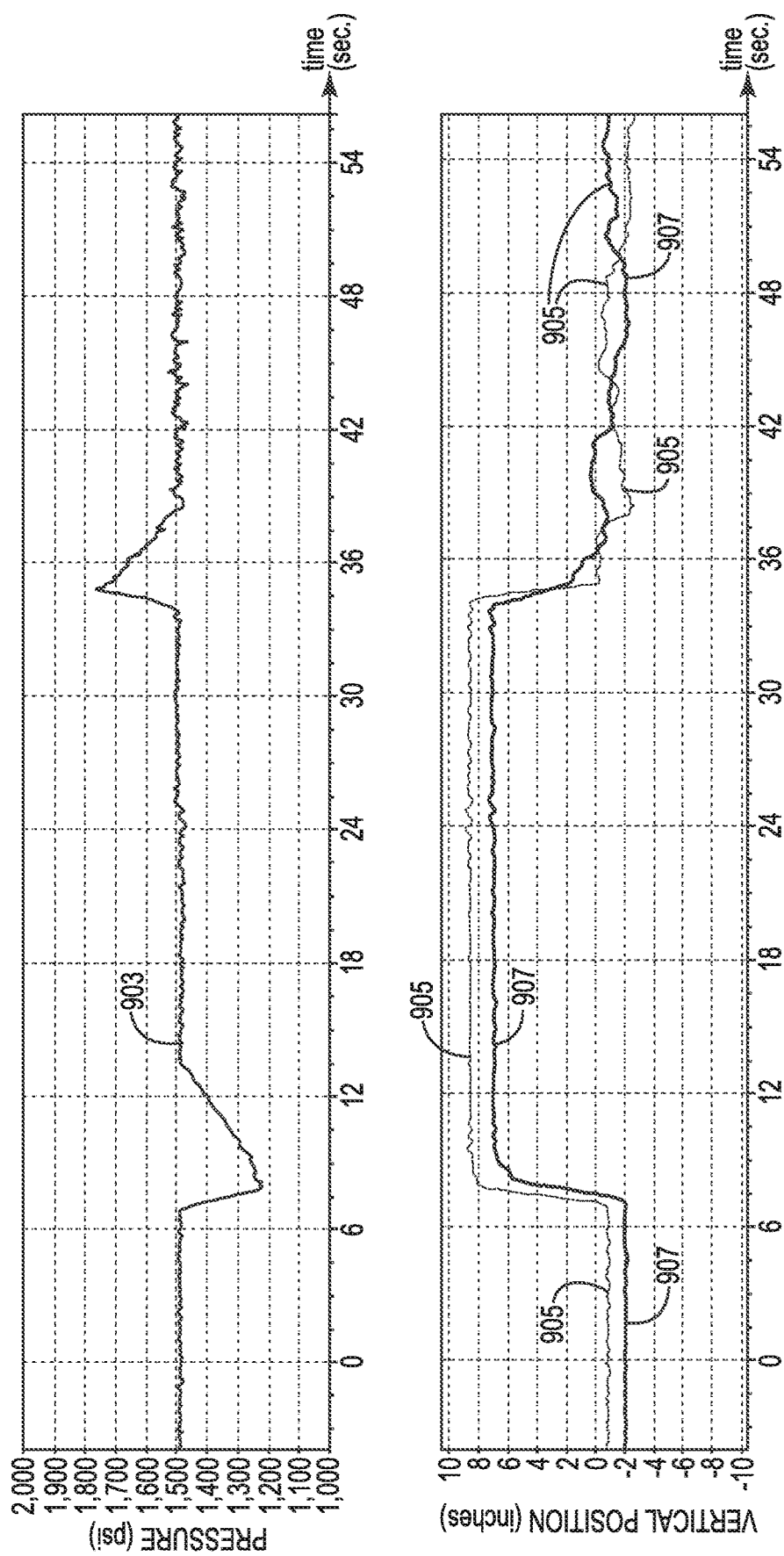
FIG. 9C is measured pressure and position data that was collected on a merger equipped with this control system.

This behavior was also observed and recorded in a windrow merger system that was field tested and that employed the control system described in connection with FIG. 9A. The measured data as a function of time is provided in FIG. 9C. Curve 903 is the measured hydraulic pressure at the pressure sensor 975. Curves 905 and 907 are the measured head heights of the two pickup heads respectively. From time=0 to about time=8 seconds, the two heads are at relatively constant heights, and the hydraulic pressure is also relatively constant. Then at about time=8 seconds, both head heights rise and maintain higher values until about time=34 seconds. At the time of the transition (t=8 sec), the measured pressure begins to drop, as would be expected. However, the control system takes effect and drives the pressure back to the set point by about time=13 seconds. Then when the next head height transition occurs at about t=34 sec, the hydraulic pressure initially increases, but within a few seconds is brought back down to the set point by the control system. In this manner, a substantially constant hydraulic pressure, and a substantially constant skid shoe force, is maintained. (In the embodiment of this field test, there was again an inverse relationship between the total skid shoe force on the ground versus the hydraulic pressure, where a higher hydraulic pressure corresponded to a lighter (smaller) skid shoe force, and a lower hydraulic pressure corresponded to a heavier (larger) skid shoe force.)

The particular design of the control system of FIG. 9A is only one of many possible control system designs that the person of ordinary skill in the art may use to accomplish the desired outcomes. For example, the proportional valve 976 may be replaced with a simpler on/off solenoid valve like valve 972. Also, in the system of FIG. 9A, the two actuators 962a, 962b are fluidly connected to each other and to the shared accumulator 974 at all times, but in alternative embodiments, the actuators 962a, 962b may be fluidly isolated from each other and may be provided with their own dedicated accumulator rather than a shared accumulator. In such cases, a first pressure transducer would be used to monitor the pressure in the first actuator/accumulator pair, and a second pressure transducer would be used to monitor the pressure in the second actuator/accumulator pair. In embodiments having more than two pickup heads, a third, fourth, etc. actuator (one for each head) could be added in a straightforward fashion to the control system of FIG. 9. In other embodiments, more than one actuator could be used per head to accomplish the raising and lowering function, and one, some, or all such actuators could be readily incorporated into the system of FIG. 9. In still other embodiments, depending on the weight of the pickup heads and other factors, the hydraulic actuators and control system may be replaced with pneumatic actuators and a pneumatic control system, or with electromechanical actuators and an electromechanical control system.

In the case of the hydraulic control system depicted in FIG. 9A, as mentioned, the system preferably connects to a PTO-driven hydraulic pump mounted to the frame assembly of the merger, rather than to the tractor-supplied hydraulic system, even though the PTO pump and the tractor pump are both hydraulic pumping systems. There are several advantages to this. One is the ability to use a larger hydraulic fluid reservoir and greater pumping capacity with lower heat generation by avoiding flow restrictions associated with the RA connection ports. Another is to leave available the tractor hydraulics RA hookup for other uses.

Techniques have been disclosed for maintaining a substantially constant skid shoe force, and/or maintaining a substantially constant hydraulic pressure, in the context of a windrow merger with one or more floating pickup heads. The substantially constant performance can be accomplished by continually or regularly monitoring a fluid pressure, force, or other relevant measurement parameter, comparing the measured value to a set point value using a suitable electronic controller, and configuring the controller to automatically take a corrective action, such as adding or releasing hydraulic fluid to or from a hydraulic component, when the measured parameter deviates from the set point value by more than a predetermined amount. The predetermined amount may be a specified increment such as 5, 10, or 15 psi, or it may be a specified percentage of the set point value or of some other value.

Unless otherwise indicated, all numbers expressing quantities, measured properties, and so forth used in the specification and claims are to be understood as being modified by the term "about". Accordingly, unless indicated to the contrary, the numerical parameters set forth in the specification and claims are approximations that can vary depending on the desired properties sought to be obtained by those skilled in the art utilizing the teachings herein. Not to limit the application of the doctrine of equivalents to the scope of the claims, each numerical parameter should at least be construed in light of the number of reported significant digits and by applying ordinary rounding techniques.

The use of relational terms such as "top", "bottom", "upper", "lower", "above", "below", and the like to describe various embodiments are merely used for convenience to facilitate the description of some embodiments herein. Notwithstanding the use of such terms, the present disclosure should not be interpreted as being limited to any particular orientation or relative position, but rather should be understood to encompass embodiments having any suitable orientations and relative positions, in addition to those described above.

Various modifications and alterations of this invention will be apparent to those skilled in the art without departing from the spirit and scope of this invention, which is not limited to the illustrative embodiments set forth herein. Features of one disclosed embodiment can also be applied to all other disclosed embodiments unless otherwise indicated. All U.S. patents, patent application publications, and other patent and non-patent documents referred to herein are incorporated by reference, to the extent they do not contradict the foregoing disclosure.

The invention claimed is:

1. A windrow merger, comprising:
a frame assembly;
a first pickup head including a first head frame, and a first pickup assembly and a first conveyor assembly supported by the first head frame, the first pickup head also including one or more first skid shoes attached to the first head frame and adapted to contact terrain below the first pickup head, the first head frame being adjustably connected to the frame assembly to allow the first pickup head to rise and fall relative to the frame assembly between a first upper limit and a first lower limit;
a first actuator connected between the first head frame and the frame assembly such that changes in a height of the first pickup head relative to the frame assembly correspond to changes in length of the first actuator; and
a control system coupled to the first actuator to control the first actuator to maintain a substantially constant first force between the one or more first skid shoes and the terrain regardless of the height of the first pickup head between the first upper limit and the first lower limit;
wherein the first actuator is a hydraulic actuator, and wherein the control system maintains a substantially constant hydraulic pressure in the hydraulic actuator;
wherein the control system is configured to dynamically control the hydraulic pressure to a set point pressure; and
wherein the merger is adapted to connect to a tractor or the like, the merger further comprising:
an input panel for mounting in the tractor to allow an operator to change the set point pressure.

2. A windrow merger, comprising:
a frame assembly;
a first pickup head including a first head frame, and a first pickup assembly and a first conveyor assembly supported by the first head frame, the first pickup head also including one or more first skid shoes attached to the first head frame and adapted to contact terrain below the first pickup head, the first head frame being adjustably connected to the frame assembly to allow the first pickup head to rise and fall relative to the frame assembly between a first upper limit and a first lower limit;
a first actuator connected between the first head frame and the frame assembly such that changes in a height of the first pickup head relative to the frame assembly correspond to changes in length of the first actuator, wherein the first actuator is a hydraulic actuator;
an accumulator hydraulically connected to the hydraulic actuator; and
a control system coupled to the first actuator to control the first actuator to maintain a substantially constant first force between the one or more first skid shoes and the terrain regardless of the height of the first pickup head between the first upper limit and the first lower limit, wherein the control system maintains a substantially constant hydraulic pressure in the hydraulic actuator and in the accumulator;
wherein the control system comprises:
a flowing hydraulic fluid constantly flowing through a flow path; and
one or more electronically actuatable valves configured to charge the accumulator by redirecting the flowing hydraulic fluid to the accumulator or to discharge the accumulator by releasing hydraulic fluid from the accumulator into the flowing hydraulic fluid to maintain the substantially constant hydraulic pressure in the accumulator.

3. The merger of claim 2, wherein the control system further comprises:
a pressure sensor connected to monitor a hydraulic pressure of the accumulator and to control the one or more electronically actuatable valves.

4. The merger of claim 2, wherein the one or more electronically actuated valves includes a solenoid valve or a proportional valve or both a solenoid valve and a proportional valve.

5. The merger of claim 2, wherein the control system further comprises:
a hydraulic pump mounted to the frame assembly and driven by a tractor PTO to cause the flowing hydraulic fluid to constantly flow through the flow path.

6. A windrow merger, comprising:
a frame assembly;
a first pickup head including a first head frame, and a first pickup assembly and a first conveyor assembly supported by the first head frame, the first pickup head also including one or more first skid shoes attached to the first head frame and adapted to contact terrain below the first pickup head, the first head frame being adjustably connected to the frame assembly to allow the first pickup head to rise and fall relative to the frame assembly between a first upper limit and a first lower limit;
a first actuator connected between the first head frame and the frame assembly such that changes in a height of the first pickup head relative to the frame assembly correspond to changes in length of the first actuator;
a control system coupled to the first actuator to control the first actuator to maintain a substantially constant first force between the one or more first skid shoes and the terrain regardless of the height of the first pickup head between the first upper limit and the first lower limit;
a second pickup head including a second head frame, and a second pickup assembly and a second conveyor assembly supported by the second head frame, the second pickup head also including one or more second skid shoes attached to the second head frame and adapted to contact terrain below the second pickup head, the second first head frame being adjustably connected to the frame assembly to allow the second pickup head to rise and fall relative to the frame assembly between a second upper limit and a second lower limit; and
a second actuator connected between the second head frame and the frame assembly such that changes in a height of the second pickup head relative to the frame assembly correspond to changes in length of the second actuator; and
wherein the control system is also coupled to the second actuator to control the second actuator to maintain a substantially constant second force between the one or more second skid shoes and the terrain regardless of the height of the second pickup head between the second upper limit and second lower limit.

7. The merger of claim 6, wherein the first and second actuators are hydraulic actuators.

8. The merger of claim 7, wherein the first and second actuators are hydraulically connected to each other.

9. The merger of claim 7, wherein the control system maintains a substantially constant hydraulic pressure in the first and second actuators.

10. The merger of claim 7, further comprising:
an accumulator hydraulically connected to the first and second actuators;
wherein the control system maintains a substantially constant hydraulic pressure in the accumulator.

11. A windrow merger, comprising:
a frame assembly;
a first pickup head including a first head frame, and a first pickup assembly and a first conveyor assembly supported by the first head frame, the first pickup head also including one or more first skid shoes attached to the first head frame and adapted to contact terrain below the first pickup head, the first head frame being adjustably connected to the frame assembly to allow the first pickup head to rise and fall relative to the frame assembly between a first upper limit and a first lower limit;
a first actuator connected between the first head frame and the frame assembly such that changes in a height of the first pickup head relative to the frame assembly correspond to changes in length of the first actuator; and
a control system coupled to the first actuator to control the first actuator to maintain a substantially constant first force between the one or more first skid shoes and the terrain regardless of the height of the first pickup head between the first upper limit and the first lower limit;
wherein a distance between the first upper limit and the first lower limit is at least 8 inches.

12. The merger of claim 11, wherein the distance between the first upper limit and the first lower limit is in a range from 10 to 30 inches.

13. A windrow merger, comprising:
a frame assembly;
a first pickup head including a first head frame, and a first pickup assembly and a first conveyor assembly supported by the first head frame, the first pickup head also including one or more first skid shoes attached to the first head frame and adapted to contact terrain below the first pickup head, the first head frame being adjustably connected to the frame assembly to allow the first pickup head to rise and fall relative to the frame assembly between a first upper limit and a first lower limit;
a first actuator connected between the first head frame and the frame assembly such that changes in a height of the first pickup head relative to the frame assembly correspond to changes in length of the first actuator; and a control system coupled to the first actuator to control the first actuator to maintain a substantially constant first force between the one or more first skid shoes and the terrain regardless of the height of the first pickup head between the first upper limit and the first lower limit;

wherein the control system includes a hydraulic pump mounted to the frame assembly and driven by a tractor PTO.

14. A windrow merger for attachment to a tractor or the like that has a power take off (PTO) drive, the windrow merger comprising:

a frame assembly including a hitch assembly and a tail assembly, the hitch assembly configured to mount to the tractor and couple to the PTO, and the tail assembly having one or more wheels attached thereto to allow the merger to roll across terrain;

a pickup head adjustably connected to the frame assembly by a hydraulic actuator to allow the pickup head to rise and fall relative to the frame assembly between an upper limit and a lower limit;

a hydraulic pump mounted to the frame assembly and driven by the PTO of the tractor; and a hydraulic path extending from the hydraulic pump to the hydraulic actuator.

\* \* \* \* \*